Figure 3:
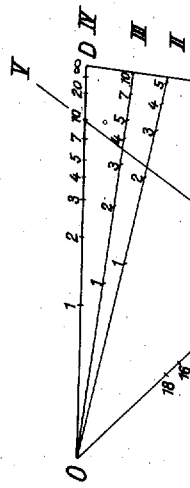

Oct. 14, 1941.  B. UFFRECHT  2,258,635
ADJUSTMENT OF CAMERAS
Filed Aug. 5, 1938  3 Sheets-Sheet 1

Inventor:
Bernhard Uffrecht.

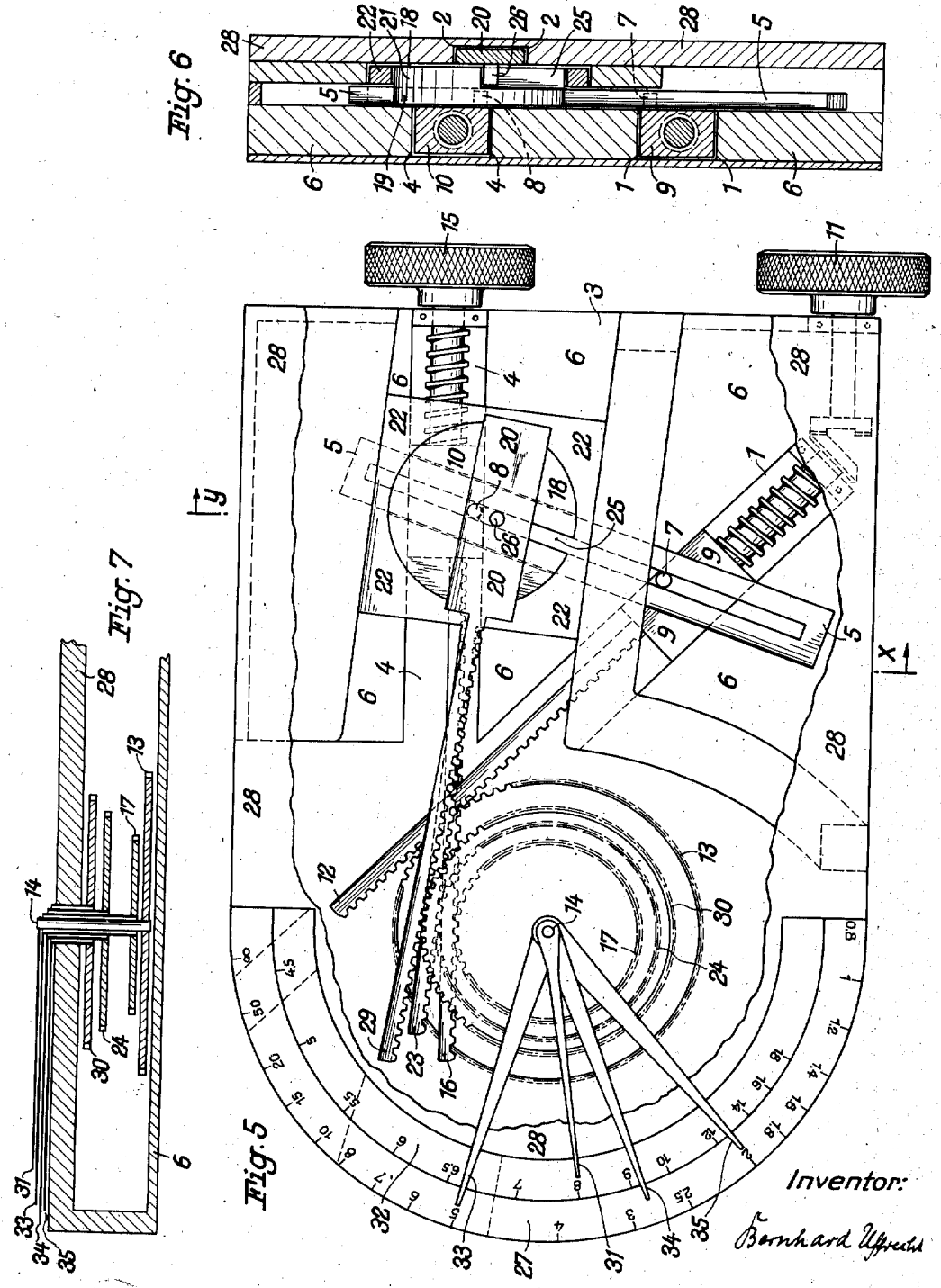

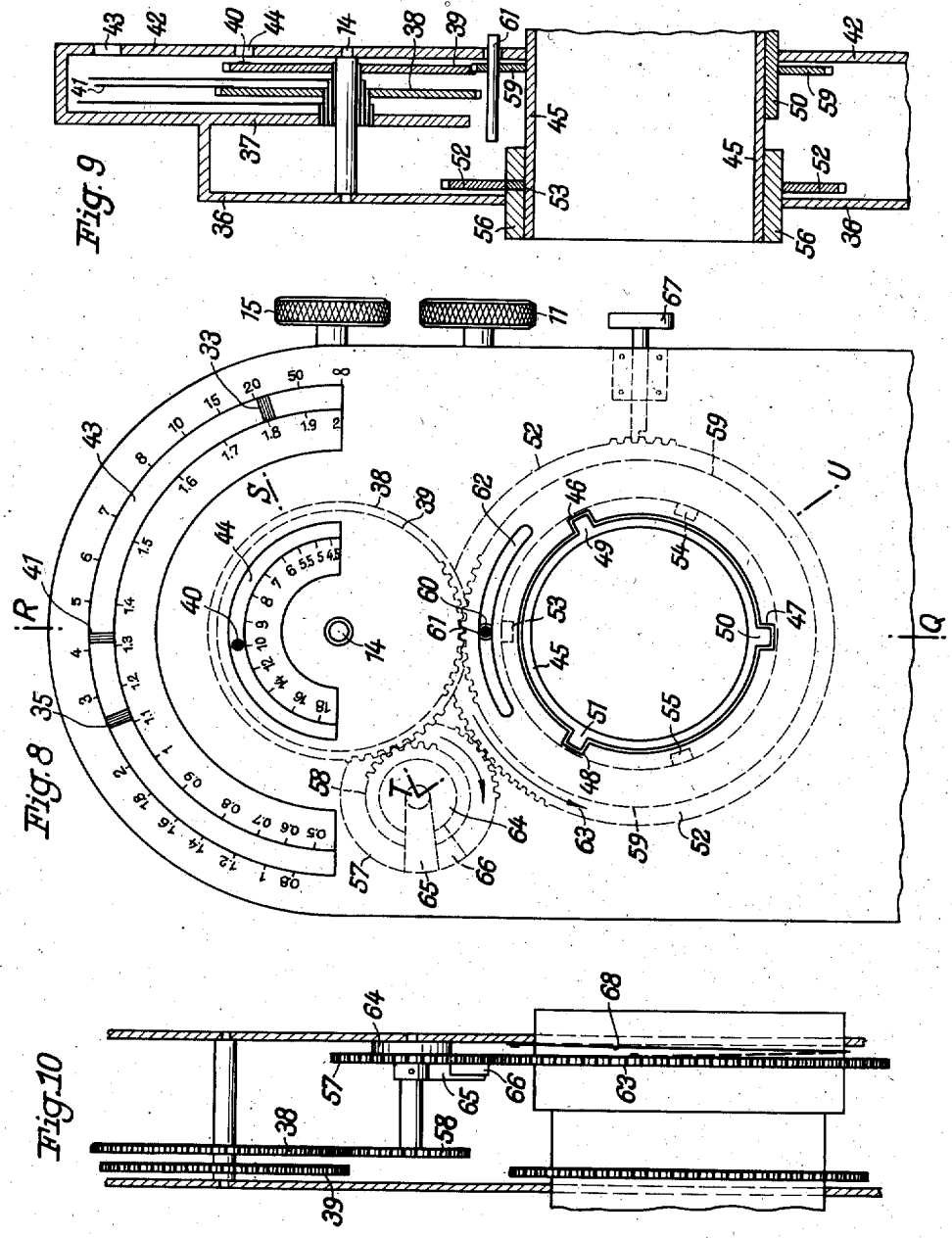

Patented Oct. 14, 1941

2,258,635

UNITED STATES PATENT OFFICE 2,258,635

ADJUSTMENT OF CAMERAS

Bernhard Uffrecht, Neuhaldensleben, Germany

Application August 5, 1938, Serial No. 223,256
In Germany March 4, 1937

4 Claims. (Cl. 95—45)

For securing sharp pictures, the user of a camera has to take into account four quantities:
$N_1$=the effective diameter of diaphragm which is required for covering sharply the field between the farthest and the nearest plane of good definition,
$N_2$=focal distance of the nearest plane of good definition,
$N_3$=focal distance of the plane in sharp focus,
$N_4$=focal distance of the farthest plane of good definition, which are connected by the two relations:

(1) $$N_1 = \frac{2Z}{f} \frac{N_2 \cdot N_4}{N_4 - N_2}$$

(2) $$N_3 = \frac{2N_2 N_4}{N_4 + N_2}$$

in which $f$ means the focal length of the camera lens and $Z$ the permissible diameter of the circle of confusion produced on the plate by points of the nearest or the farthest plane of good definition.

Of those four quantities, only two can be chosen freely, after which the two others are definitely fixed according to the relations (1) and (2).

In applying the usual method for securing sharp pictures by using an optical range finder and a depth of focus scale successively, one has firstly to choose a principal point of the subject to be photographed, whereby the distance $N_3$ is fixed, and then to estimate the distances $N_2$ and $N_4$, by which the required lens stop is determined. As all these three distances cannot be chosen or estimated simultaneously and freely, however, they must be—in many cases—corrected and, under difficult conditions, recorrected afterwards for adapting them to the given conditions. A considerable degree of skill, experience and attention is therefore necessary for using this method under varied and difficult conditions.

In contrast to this method, the present invention secures sharp pictures automatically under all circumstances without any special attention to or manipulation for the adjustment of the diaphragm and even without the use of a range finder. This is effected by setting the estimated distances of the nearest and of the farthest plane of good definition upon scales on the camera, whereby errors in estimating the distances of the nearest and of the farthest plane of good definition will never diminish but even increase the sharpness of the image, provided only that the nearest distance is underestimated and the farthest distance is overestimated.

Moreover, instead of the nearest and farthest planes of good definition, any other two of the four quantities $N_1$, $N_2$, $N_3$, $N_4$ can be set on scales of the camera, whereby always, simultaneously and automatically, the camera lens is focussed, the iris diaphragm is adjusted, and the four numbers $N_1$, $N_2$, $N_3$, $N_4$, belonging together according to the formulas (1) and (2), are indicated by indexes gliding along the scales on the camera.

Other achievements and properties which distinguish my invention from other ones, will appear hereinafter.

The invention is based on optical and geometrical relations, which as a part and as the principle of the invention are described below and are illustrated by Fig. 1, Fig. 2, Fig. 3 and Fig. 4.

Fig. 5, Fig. 6 and Fig. 7 illustrate, in plan and in two sections, an extra apparatus based on the above relations and achieving, simultaneously and automatically, the adjustment of any two of the four numbers $N_1$, $N_2$, $N_3$ and $N_4$ by adjusting the two others manually.

A device of the same kind, but attached to the lens holder of a folding camera and connected with its lens and iris diaphragm by transmissions for adjusting the lens and the diaphragm automatically by setting any two of the four quantities $N_1$, $N_2$, $N_3$, $N_4$ upon scales of the camera, is illustrated by Fig. 8, Fig. 9 and Fig. 10.

Figure 1:
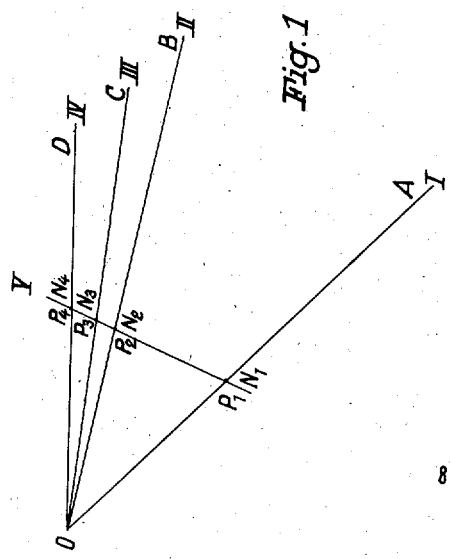

Referring now more particularly to Fig. 1, there are shown four rays I, II, III, IV diverging from a point O and forming an harmonic pencil. The rays of every such a pencil can be always provided with scales (series of numbers) so that every four numbers, lying in a straight line V on points $P_1$, $P_2$, $P_3$, $P_4$ of I, II, III and IV respectively, can be always interpreted as numbers $N_1$, $N_2$, $N_3$, $N_4$ belonging together according to the formulas (1) and (2). In the most general case, all four of these scales are perspective copies of the natural scale. For the purposes in question, however, it is advantageous to choose the scale on ray I especially as a natural one with the number $o$ in O. On this condition, the three scales on II, III and IV are always similar, and any straight line parallel to ray I intersects with each of them in the same number. On all four scales, therefore, the number $o$ lies in O.

These statements in combination with the above formulas (1) and (2) make possible the construction of all four scales for each pencil, each $f$ and each $Z$ when the unit of the natural scale on I and, moreover, one of the numbers $N_2$, $N_3$ or $N_4$ of one of the three scales on II, III or IV are chosen at random.

For the purposes of the invention, however, it is necessary to make a suitable selection of the angles of the harmonic pencil and of the length of its rays. There may be chosen, once for all:

$$\angle (I, IV) = 45°$$

$$\tan \angle (III, IV) = \frac{1}{9}$$

It follows:

$$\tan \angle (II, IV) = \frac{1}{5}$$

The length of the scale on ray I reaching from $o$ to that point A in which the number $d$ for the maximum diameter of the diaphragm lies, may be chosen $$oA = 10 \text{ units}$$

and the length of the scale on ray IV reaching from $o$ to that point D in which the number $\infty$ lies, $$oD = 8 \text{ units.}$$

It follows $$oC = \sqrt{82} \text{ units}$$

$$oB = 2\sqrt{26} \text{ units}$$

if C and B denote those points of ray III or II respectively on which the number $\infty$ comes to lie.

The length of the unit can be chosen as small as compatible with the demands of exactness. If $f = 10$ cm., a length of 0.2 cm. is sufficient for the unit. If $f$ is smaller, the length of the unit may be smaller, too.

If the angles and the lengths are chosen as described, the number $$M = \frac{1}{5} \cdot \frac{f^2}{Z \cdot b \sqrt{2}}$$

comes to lie in all three scales II, III and IV in the middle between $o$ and $\infty$. In the above formula, $b$ means $$b = \frac{f}{d}$$

For instance: if $f = 10$ cm., $$Z = \frac{f}{500}, \quad b = 4.5$$

then $$M = 159 \text{ cm. or } 1.59 \text{ m.}$$

Figure 2:
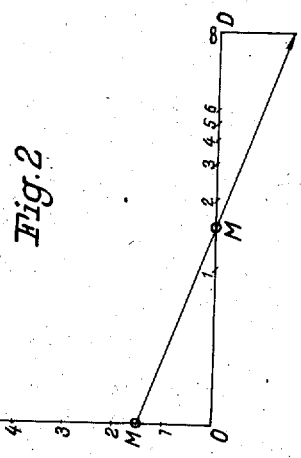

Now the scales on II, III and IV can be easily constructed in the following manner, illustrated by Fig. 2:

Draw through the point O of the scale to be graduated a straight line bearing the natural scale of numbers so that nought coincides with O. Connect the number M of this scale with the middle of the scale to be graduated and let the connecting line cut that parallel to the natural scale which runs through the end point of the scale to be graduated. This intersection is the center of perspective between the natural scale and the scale to be graduated, and the graduation can now be carried through by producing a perspective copy of the infinite natural series of numbers on the scale to be graduated. Of course, all numbers $N_1$, $N_2$, $N_3$, $N_4$ can be replaced by other numbers connected with $N_1$, $N_2$, $N_3$, $N_4$ by mathematical relations, for instance $N_1$ by $$N'_1 = \frac{f}{N_1}$$

or $N_2$, $N_3$, $N_4$ by $N'_2 = N_2 + f$, $N'_3 = N_3 + f$, $N'_4 = N_4 + f$, so that all distances are reckoned from the camera lens itself instead from its front focal point.

Instead of $\infty$, another number, say L, is put on the point D of IV, or C of II, or B of II; the number $$ML = \frac{M \cdot L}{M + L}$$

comes to lie in all three scales II, III and IV in the middle between O and $\infty$, provided that the scale on I remains unchanged.

Figure 4:
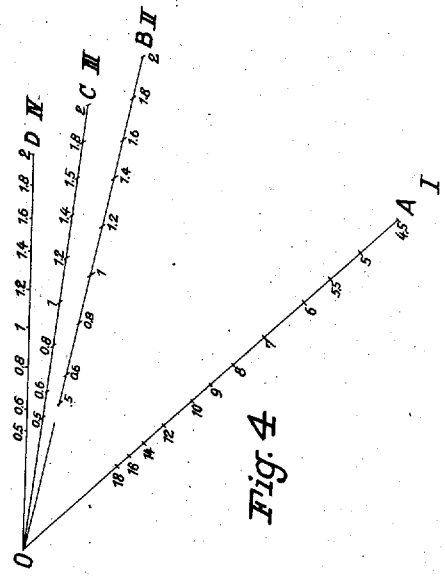

Fig. 3 illustrates the resulting scales if $L = \infty$, and Fig. 4 the resulting scales if $L = 2$.

If now the four rays I, II, III, IV in Fig. 1 are replaced by four slide guides and the four points $P_1$, $P_2$, $P_3$, $P_4$ by four knobs which are free to slide in these slide guides, and if the straight line V is replaced by a movable bar itself containing a slide guide in which the said four knobs can slide freely, there results a device achieving, simultaneously and automatically, the adjustment of any two of the four numbers $N_1$, $N_2$, $N_3$, $N_4$ by adjusting the two others manually.

If, furthermore, the knob $P_1$ is connected with the iris diaphragm of a camera by a transmission for transferring the movement of $P_1$ proportionally to the said diaphragm, and if the knob $P_3$ is connected with the camera lens by a transmission for transferring the movement of $P_3$ on the said lens in such manner that the displacement $CP_3$ of $P_3$ is connected with the displacement $a$ of the camera lens by the formula $$a = \frac{f^2}{M} \cdot \frac{CP_3}{OC - CP_3} + \frac{f^2}{L}$$

in which $a =$ the distance of the rear focal point from the image plane, then results a device achieving, simultaneously and automatically, the adjustment of the diaphragm and of the camera lens by setting any two of the four knobs $P_1$, $P_2$, $P_3$, $P_4$ upon scales of the device.

The first device can be used as auxiliary apparatus for the adjustment of cameras, whilst a device of the second kind can be used directly as adjusting device for cameras.

Being similar, the three scales on II, III and IV can be replaced by a single one by transferring the movements of the knobs $P_2$, $P_3$ and $P_4$ to any part of the apparatus by transmissions which diminish the movement of $P_3$ in a ratio of $$\frac{8}{\sqrt{82}}$$

and that of $P_2$ in a ratio of $$\frac{8}{2\sqrt{26}}$$

to that of $P_4$. If suitably chosen, such transmissions allow moreover to make the new scale as big as desirable for its being read, and on the other hand to make the slide guides as small as mentioned.

In the above term for $a$, the displacement $CP_3$ of $P_3$ has an influence on the first part $$\frac{f^2}{M} \cdot \frac{CP_3}{OC - CP_3} = u$$

and the number L on the second part $$\frac{f^2}{L} = v$$

only. If, therefore, the transmission between $P_3$ and the camera lens effects the displacement $u$ of the camera lens and a contrivance is provided for pulling out the camera lens by the amount of $v$ in addition to $u$, then special scales with small numbers L in the point C can be used for close-up photographs.

The circle of confusion Z, chosen for the construction of the scales on II, III and IV, determines the degree of sharpness with which the subject betwen the limits $N_2$ and $N_4$ is copied. For instance, if $$Z = \frac{f}{500}$$

the degree of sharpness is sufficient for a picture size of 6 x 9 cm. If an enlargement of the picture up to the size $n \cdot 6$ x $n \cdot 9$ cm. is intended, only the number $N_1'$ of the four numbers $N_1'$, $N_2$, $N_3$, $N_4$, belonging together if $$Z = \frac{f}{500}$$

is to be changed into $n \cdot N_1'$. Therefore, the four scales of the auxiliary apparatus, constructed for a fixed picture size, can be used unchanged for every enlargement intended in a very simple manner. If the device is connected with the diaphragm and the lens of the camera, an appliance for breaking off, the transmission between $P_3$ and the camera lens must be provided and actuated before the knob $P_1$ can be set upon the number $n \cdot N_1'$.

After these general statements of the principle and the theory of my invention and the general properties following from it, I will now proceed to describe two preferred embodiments thereof.

Fig. 5 illustrates the preferred embodiment of the extra apparatus for the adjustment of cameras mentioned above. Into the plate 6, serving as the base of the apparatus, the slide guides 1 and 4, embodying the rays I and IV of Fig. 1, are grooved, in which the pins 7 and 8, embodying the points $P_1$ and $P_4$ of Fig. 1 and mounted on slides 9 and 10 respectively, are free to slide. The displacement of pin 7, effected by working the adjusting screw 11, is transferred by the rack 12 to the toothed wheel 13 mounted on the axle 14. The displacement of pin 8, effected by working the adjusting screw 15, is transferred by the rack 16 to the toothed wheel 17 mounted on the same axle 14. The pins 7 and 8 project into the grooved and movable bar 5, which is therefore moved when the pins 7 and 8 are moved. The bar 5 embodies the straight line V in Fig. 1 and projects into the foot 19 of the circular slide 18 so that the slide 18 is free to glide along the bar 5. The head 21 of the slide 18 projects into the sash frame 22, which is free to slide in the slide guide 3 and keeps the center of the circular slide 18 in the straight line III of Fig. 1.

The sash frame 22 transfers, by means of the rack 23, the displacement of 18, effected by working the screw 11 or 15, to the toothed wheel 24 mounted on the axle 14. The circular head 21 of the slide 18 is provided with the groove 25, which runs from the center of the head in the direction of the bar 5. The groove 25 can be conceived as a part of the bar 5 brought to another level. Into the groove 25, there projects the pin 26 mounted on the slide 20 and free to slide in the slide guide 2 (Fig. 6) embodying the ray II in Fig. 1 and grooved into the covering plate 28 of the apparatus as it is shown in Fig. 6.

The rack 29 transfers the displacement of pin 26 to the toothed wheel 30 mounted on the axle 14. The diameters $d_2$, $d_3$, $d_4$ of the wheels 17, 24, 30 respectively are to be chosen so that $$d_4 : d_3 : d_2 = \sqrt{104} : \sqrt{62} : \sqrt{64}$$

if the angles between the slide guides 1, 2, 3, and 4 are chosen as described above. With the wheel 13, there is connected the index 31 which glides along the dial 32 indicating which lens stop should be used. The wheels 17, 24, 30 (see Fig. 7) are connected with the indexes 33, 34, 35 respectively which glide along the dial 36 indicating the focal distance of the farthest plane of good definition, of the plane in sharp focus and of the nearest plane of good focus respectively. If it is to be read to which distance the objective lens is to be adjusted and which lens stop is to be chosen when the farthest and nearest plane of a subject are given, first the index 33 and then the index 35 must be set upon the scale 27 by working first the adjusting screw 15 and then the adjusting screw 11. If, however, the lens stop is chosen according to the prevailing light, first the screw 11 and then the screw 15 must be worked.

If, by working the screws 11 and 15, not only the numbers $N_1$, $N_2$, $N_3$, $N_4$ shall be indicated, but also the camera objective and the diaphragm shall be focussed and adjusted automatically, the device described must be attached to the lens holder of the camera and must be connected with its objective and diaphragm.

Fig. 8 illustrates such a lens holder in elevation, whilst Fig. 9 and Fig. 10 show two sections.

The lens holder consists of a casing, on the base plate 36 of which the described device is fixed. The position of this device can be recognized by the screws 11 and 15 and by the axle 14. The other parts of the device, situated between its base plate 36 and its covering plate 37, are not shown in Fig. 8, Fig. 9 and Fig. 10. Of the four indexes 31, 33, 34 and 35, the two indexes 34 and 31 are replaced by the toothed wheels 38 and 39 respectively, the latter one bearing the point 40 serving as indicator for the lens stop, and the former one bearing the index 41 for the distance of sharp focus. The scales are fixed on the covering plate 42 of the lens holder, and the movement of the indexes 33, 41 and 35 can be seen through the window 43 of the covering plate 42, whilst the movement of point 40 can be seen through the window 44.

The tube 45 of the camera objective fits into the base plate 36 and into the covering plate 42 so that the objective is free to be moved in the direction of the optical axis, whilst rotation of the objective is prevented by the incisions 46, 47 and 48 of the covering plate 42, into which there project the rails 49, 50, 51 running along the tube of the objective. A toothed circular ring 52 is mounted on the base plate 36, the rotation axis of which coincides with the optical axis of the objective. The pins 53, 54, 55 project from the inside of the ring 52 into curves which are grooved into the sleeve 56 screwed onto the end of the objective tube. These curves (not shown) are constructed according to the formula for $u$. The ring 52 is connected with the toothed wheel 38 by means of the toothed wheels 57 and 58 and therefore brings the camera objective always into the right position, indicated by the index 41, when the screw 11 or 15 is worked.

The toothed ring 59 mounted on the inside of the covering plate 42 meshes with the toothed wheel 39 so that its axis of rotation coincides with the optical axis of the camera lens. This ring 59 bears the hole 60, through which the lever 61 of the iris diaphragm is put. Said lever 61 is inserted into the casing of the lens holder through the incision 62 of the covering plate 42. So, by working the screw 11, the diaphragm is adjusted as indicated by the index 40.

If the camera is provided with a device allowing to impart an advance movement to the lens holder as a whole, one definite scale of distance as described above corresponds to each advance. One of these scales, corresponding to the advance $$\frac{f^2}{2 \cdot 100} \text{ cm.}$$

and therefore being usable for the distances between 0.5 and 2 meters, is shown in Fig. 8 in addition to the normal scale for distances from $\infty$ to 0.8.

In order to eliminate lost motion, it is advantageous to provide the ring 52 with the spring 68 (see Fig. 10), which tends to turn the ring in the direction of the arrow 63. Moreover, the spring gives the possibility to interrupt the transmission between the ring 52 and the toothed wheel 34 in order to multiply the degree of sharpness, as described above. If the wheel 57 is composed of an inner disc 64 rigidly connected to the axle, and of an outer circular ring rotatable about said disc 64, the stop 66 mounted on said outer ring is pressed by the said spring 68 against the arm 65 mounted on the inner disc 64. In this way, the outer ring always follows the movement of the inner disc. If, however, the ring 52 is arrested by the bolt 67, the indicator 40 can be put on a higher number of diaphragm by the screw 11 without the objective altering its position.

If it is intended to obtain an enlargement of $n$ times the normal size, one adjusts the mechanism at first as in the normal case, thereafter arrests the objective by the bolt 67 and now adjusts the diaphragm to the $n$-fold of its former number.

While I have described what I at present consider the preferred embodiments of my invention, it will be obvious to those skilled in the art that various changes and modifications may be made without departing from my invention, and I, therefore, aim in the appended claims to cover all such changes and modifications as fall within the true spirit and scope of my invention.

What I claim is:

1. An adjusting device for photographic purposes comprising four fixed slide guides (1, 2, 3, 4) forming by their projections an harmonic pencil; four knobs ($P_1$, $P_2$, $P_3$, $P_4$) which are free to slide in said slide guides respectively; a fifth movable slide guide in which the said four knobs are free to slide and by which they always are kept in a straight line and therefore are brought into a definite position if any two of them are brought into a definite position; a first scale coordinating a definite number $N_1$ to each position of the first knob ($P_1$); a second scale coordinating a definite number $N_2$ to each position of the second knob ($P_2$); a third scale coordinating a definite number $N_3$ to each position of the third knob ($P_3$); a fourth scale coordinating a definite number $N_4$ to each position of the fourth knob ($P_4$); and a contrivance for setting any two of the four knobs on numbers of their scales manually, whereby, automatically and simultaneously, the two other knobs always are set on numbers which, together with the first-mentioned numbers, form a quadruple of numbers connected by the relations:

$$N_1 = \frac{2Z}{f} \frac{N_2 \cdot N_4}{N_4 - N_2}$$

$$N_3 = \frac{2 N_2 \cdot N_4}{N_4 + N_2}$$

in which $f$ and $Z$ are any two numbers chosen freely but unchangeable and in which $N_1$ = effective diameter of diaphragm which is required for covering sharply the field between the farthest and the nearest planes of good definition, $N_2$ = focal distance of the nearest plane of good definition, $N_3$ = focal distance of the plane in sharp focus, $N_4$ = focal distance of the farthest plane of good definition, $Z$ = permissible diameter of the circle of confusion, produced on the image plane by points of the nearest or farthest plane of good definition, and $f$ = focal length of the camera lens.

2. In a camera with an iris diaphragm an adjusting device as described in claim 1 and comprising a transmission for transferring the movement of $P_1$ proportionally to the lever of the diaphragm; and a transmission for transferring the movement of $P_3$ relative to the displacement $a$ of the camera lens and with respect to the displacement $CP_3$ of $P_3$ according to the formula $$a = \frac{f^2}{M} \frac{CP_3}{OC - CP_3}$$

in which denote:

$f$ the focal length of the camera lens, $C$ that point of the third slide guide in which the number $\infty$ lies, $O$ that point of the third slide guide in which the number $o$ lies, $M$ that number of the third slide guide which lies in the middle of $CO$, $a$ the distance of the rear focal point from the image plane.

3. In a camera with an iris diaphragm an adjusting device as described in claim 1 and comprising a transmission for transferring the movement of $P_1$ proportionally to the lever of the diaphragm; and a transmission for transferring the movement of $P_3$ relative to the displacement $a$ of the camera lens and with respect to the displacement $CP_3$ of $P_3$ according to the formula $$a = \frac{f^2}{M} \frac{CP_3}{OC - CP_3}$$

in which denote:

$f$ the focal length of the camera lens, $C$ that point of the third slide guide in which the number $\infty$ lies, $O$ that point of the third slide guide in which the number $o$ lies, $M$ that number of the third slide guide which lies in the middle of $CO$, $a$ the distance of the rear focal point from the the image plane, said device comprising furthermore a contrivance for breaking off the transmission between $P_3$ and the camera lens.

4. An adjusting device for photographic purposes comprising four fixed slide guides (1, 2, 3, 4) forming by themselves an harmonic pencil; four knobs ($P_1$, $P_2$, $P_3$, $P_4$) which are free to slide in said slide guides respectively; a fifth movable slide guide in which the said four knobs are free to slide and by which they always are kept in a straight line and therefore are brought into a definite position if any two of them are brought into a definite position; a first scale coordinating a definite number $N_1$ to each position of the first knob ($P_1$); a second scale coordinating a definite number $N_2$ to each position of the second knob ($P_2$); a third scale coordinating a definite number $N_3$ to each position of the third knob ($P_3$); a fourth scale coordinating a definite number $N_4$ to each position of the fourth knob ($P_4$); and a contrivance for setting any two of the four knobs on numbers of their scales manually, whereby, automatically and simultaneously, the two other knobs always are set on numbers which, together with the first-mentioned numbers, form a quadruple of numbers connected by the relations:

$$N_1 = \frac{2Z}{f} \frac{N_2 \cdot N_4}{N_4 - N_2}$$

$$N = \frac{2N_2 \cdot N_4}{N_4 + N_2}$$

in which $f$ and $Z$ are any two numbers chosen freely but unchangeable and in which $N_1$ = effective diameter of diaphragm which is required for covering sharply the field between the farthest and the nearest planes of good definition, $N_2$ = focal distance of the nearest plane of good definition, $N_3$ = focal distance of the plane in sharp focus, $N_4$ = focal distance of the farthest plane of good definition, $Z$ = permissible diameter of the circle of confusion, produced on the image plane by points of the nearest or farthest plane of good definition, and $f$ = focal length of the camera lens.

BERNHARD UFFRECHT.